United States Patent [19]

Möthrath

[11] Patent Number: 4,718,332

[45] Date of Patent: Jan. 12, 1988

[54] ELECTRIC TOASTER

[75] Inventor: Georg Möthrath, Gründau, Fed. Rep. of Germany

[73] Assignee: Braun Aktiengesellschaft, Kronberg, Fed. Rep. of Germany

[21] Appl. No.: 861,079

[22] Filed: May 8, 1986

[30] Foreign Application Priority Data

May 8, 1985 [DE] Fed. Rep. of Germany ....... 3516553

[51] Int. Cl.⁴ .............................................. H05B 3/06
[52] U.S. Cl. ......................................... 99/385; 99/401; 99/447
[58] Field of Search .................. 99/385, 389, 401, 447; 219/521

[56] References Cited

U.S. PATENT DOCUMENTS

| 658,189 | 9/1900 | Morgan | 99/389 |
|---|---|---|---|
| 2,476,142 | 7/1949 | Goddard | 99/385 X |
| 3,109,360 | 11/1963 | Baume | 99/401 X |
| 4,396,825 | 8/1983 | Cox et al. | 99/389 X |

FOREIGN PATENT DOCUMENTS

| 1852571 | 5/1962 | Fed. Rep. of Germany . | |
| 75356 | 12/1970 | Fed. Rep. of Germany . | |
| 2745218 | 4/1975 | Fed. Rep. of Germany | 99/385 |
| 2554876 | 7/1977 | Fed. Rep. of Germany . | |
| 3106719 | 9/1982 | Fed. Rep. of Germany . | |
| 2305138 | 3/1975 | France . | |

Primary Examiner—H. Hampton Hunter

[57] ABSTRACT

An electric toaster has heating elements, at least one toast well into which the toast is fed through a loading and unloading opening, and a multi-walled housing. The multiple housing walls are separated from one another and form a meander-shaped flow channel for an air stream introduced from outside. An air stream enters the flow channel through an air inlet opening and cools the outer walls of the housing by convection as it passes through the meander-shaped flow channel and emerges through an air outlet opening into the toast wall. The meander-shaped flow channel includes reversing curve portions located in top and bottom areas of the meander-shaped flow channel structure such that the air stream flows in an upward direction in one portion and in a downward direction in another portion of the meander-shaped flow channel.

22 Claims, 7 Drawing Figures

ELECTRIC TOASTER

The invention relates to an electric toaster according to the preamble of claim 1. German Pat. No. A1 31 06 719 teaches an electric toaster whose outside housing walls are made with double walls. The outer walls form a flow channel for an air stream which enters at an inlet opening provided in the bottom and escapes again from the toaster through an outlet opening on the top of the housing. The air stream is set moving by the heating of the walls and flows upward. Since colder fresh air flows in continuously, the outer housing walls are insulated.

It has been found that, after several successive toastings, the insulating action is no longer sufficient to keep the outer housing walls at a low temperature. In particular, the upper area of the housing is cooled only slightly in this manner.

Another electric toaster with a double-walled housing is known from last German Pat. No. 75 356. The electric toaster from East German Pat. No. 75 356 suffers from the same disadvantages, described above, as the toaster in German Pat. No. A1 31 06 719.

In addition, an electric toaster is known from German Pat. No. U18 52 571 which has cooling fins in its font. The cooling fins are cooled by the air stream as it flows in, keeping the foot of the electric toaster at a low temperature. However, the outer housing walls of the known toaster are not cooled.

The goal of the invention, therefore, is to provide an electric toaster whose outer walls remain sufficiently cool, even after several successive toastings, for the entire height of the housing.

According to the invention, an electric toaster is provided whose outer housing walls are designed to form a meander-shaped flow channel, with the individual turn segments running to and fro along the height of the housing. The reversing curves of the flow channel are therefore located in the top and bottom areas of the housing. Since the walls of the meander-shaped flow channel which are closest to the heating elements, referred to hereinbelow simply as flow channels, are heated to a greater degree than the outer walls, an air stream flows continuously through the flow channel. The air stream cools the walls by convection and is heated as it flows further into the flow channel. Since the flow channel according to the invention is much longer than that according to the state of the art, much more time is available for the air stream to absorb the heat from the outer walls and to transport it inward to the toasting chamber. By suitably choosing the length, width, and depth of the flow channel, which are adapted to the heating power of the heating elements and the flow conditions in the toasting chamber, a continuous air stream is produced whose continuous cooling action is sufficient to keep the outermost housing walls at a safe temperature, even if the heating elements operate continuously.

In addition, the long flow channel offers the advantage that the entire outermost housing wall remains at a low temperature even at the uppermost edge. The upper wall of the toaster is advantageously cooled by the upper reversing curves. The lower reversing curves cool the bottom areas.

The heat given off by the heating elements heats the air stream which rapidly rises upward and draws cold air after it which cools the lower part of the toast. The toast is usually lighter after toasting at the bottom than at the upper edge. Attempts have been made to overcome this problem by using asymmetrically wound heating elements. According to a further embodiment of the invention, however, the air stream, which preferably enters the toasting chamber at the bottom and is considerably heated therein, is used in the toasting process, with the heated air stream acting on the lower part of the toast and supporting the toasting action by drying the toast. In addition to the advantage of continuous cooling(in toasters according to the state of the art, no cooling is provided but only insulation, i.e. time-delayed heating)the additional benefit is achieved that the heat energy given off to the outside at the housing walls is not lost to the toasting process and increases the efficiency to the toaster.

According to another embodiment of the invention, the flow cross section of the flow channel increases with increasing heating of the air stream. In this way, the increase in air volume produced by heating alone produces a constant flow velocity over the entire flow path. The change in flow channel cross section can be accomplished in simple fashion by varying the distance between the partitions and intermediate walls which form the flow channel.

According to another embodiment, cooling ribs are disposed in the flow channel in the flow direction, said ribs increasing the surface of the walls and intensifying the cobling action. In addition, the cooling ribs contribute to improved strength of the individual walls.

The Invention is described hereinbelow in greater detail with reference to the drawing.

Figure 1:
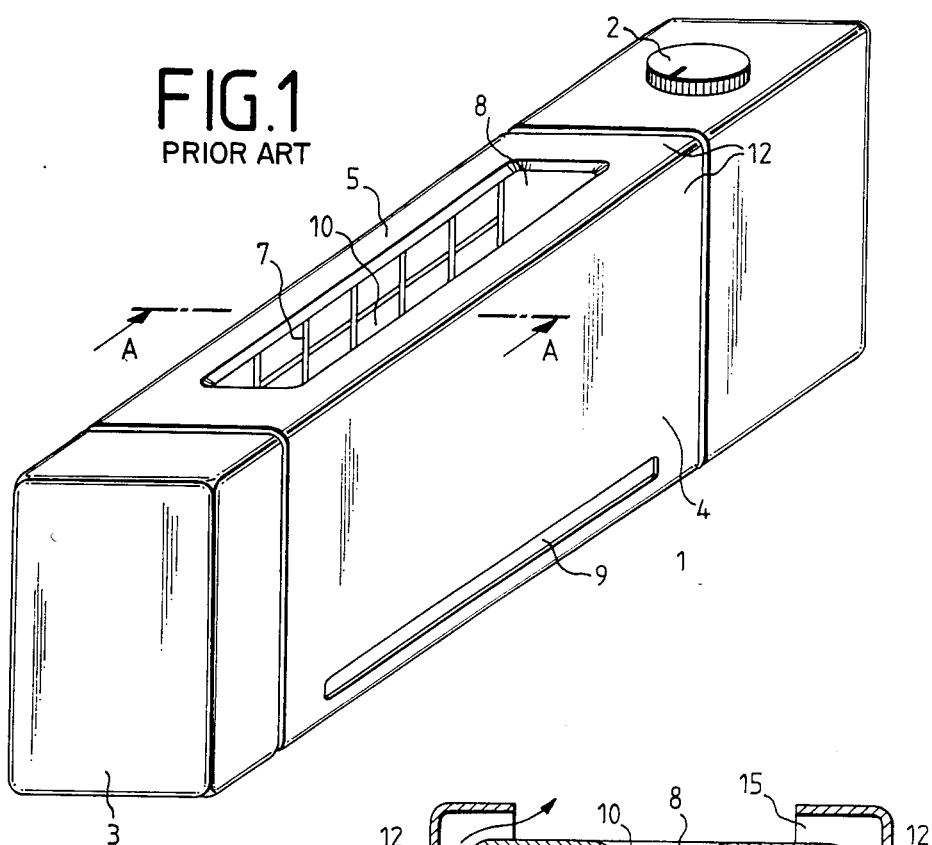
FIG. 1 is a perspective view of a known electric toaster.

FIG. 1 shows a known electric toaster 1 with a toast well 10. Toaster 1 has side walls 3, lengthwise walls 4, a top wall 5, and a bottom 6 not shown. A toasting control knob 2 adjusts the toasting time. A loading and unloading opening 8 for the toast into toast well 10 is provided in top wall 5. Protective grates 7 in front of heating elements 11 not shown are provided in toast well 10. Lengthwise walls 4 are provided with an air intake opening 9, through which fresh air is supplied to toast well 10.

Figure 2:
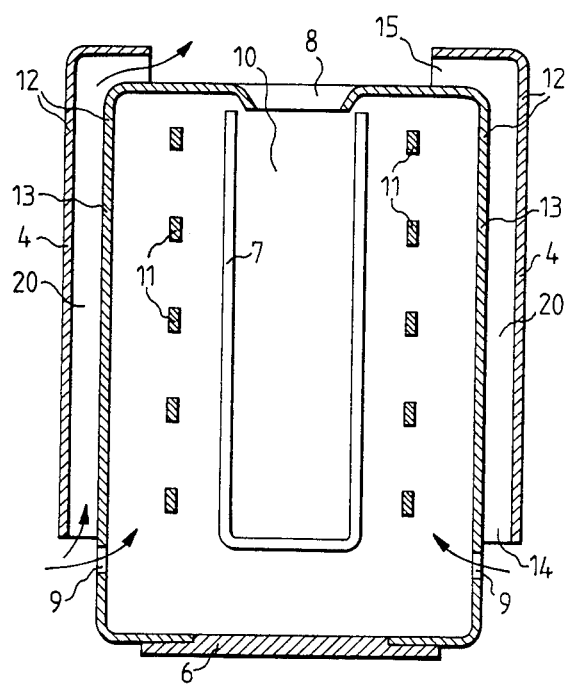
FIG. 2 is a section through the toaster in FIG. 1 along line A—A, with devices for cooling the outer walls of the housing analogous to the state of the art.

When toaster 1 is switched on, normally lengthwise walls 4 of housing 12 are intensively heated in particular. Therefore, attempts have been made to cool lengthwise walls 4 in particular by using simple means. FIG. 2 shows a section along line A—A through toaster 1 in FIG. 1, showing additional devices for cooling the outer walls of housing 12.

The cooling devices include a double wall for housing 12, with an additional wall mounted on the original outer wall, and now forming as partition 4 the outermost housing wall. The double wall of housing 12 forms a flow channel 20 into which cold air flows through an air inlet opening 14. The air is particularly heated at the inner wall, hereinafter referred to as partition 13, and rises in flow channel 20 upward to an air outlet 15. As it passes along partitions 4 and 13 the heat is transferred from the outer walls of the housing and produces more of an insulating effect than a cooling effect. However, after several successive toastings, partition 4 also heats up considerably. In particular, the upper housing area does not undergo sufficient cooling since insufficient time is left for the already heated air stream to take up additional heat energy. In addition, the heated or warmed air disadvantageously flows directly into the handle area of the toaster.

Although FIG. 1 shows a toaster 1 with one toast well 10, the invention described hereinbelow also refers to other designs of electric toasters, for example those with two toast wells 10. Likewise the invention is not limited to the lengthwise walls 4 of the housing, which are described hereinafter, but can be applied to all of the outer walls of the housing.

Figure 3:
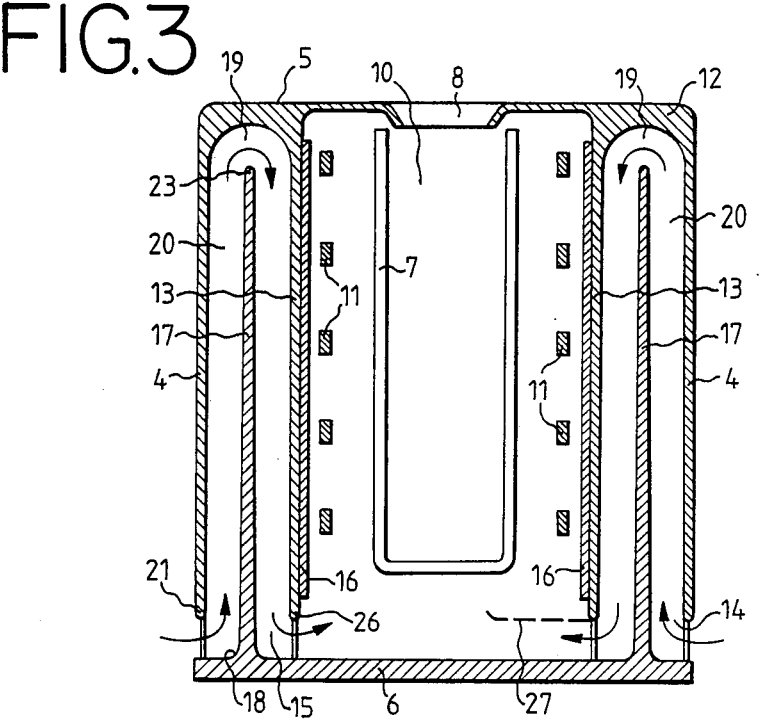
FIG. 3 is a section through a toaster according to the invention.

FIG. 3 shows a section through an electric toaster 1 according to the invention. According to the invention, flow channel 20 has a meander-shaped pattern produced by suitably designing partitions 4 and 13 and intermediate walls 17. In FIG. 3 the meander-shaped pattern is limited to a U-shaped section, consisting of two half turns. Depending on the application, more back-and-forth turns than those shown can be provided. It has been found that in most applications the U-shaped segment of flow channel 20 shown in FIG. 3 is sufficient to cool the outer wells of the housing. Preferably the air inlet and outlet openings 14 and 15 are provided in the vicinity of bottom 6, while air outlet opening 15 terminates in toast well 10 according to the invention. However, embodiments are also possible in which the air inlet and outlet openings are located in the upper housing area. Likewise, air inlet opening 14 can be provided at the top and air outlet opening 15 at the bottom, or vice versa. In this case, an additional half-turn abuts flow channel 20 shown in FIG. 3. If air inlet opening 14 is located in the vicinity of bottom 6, there is the advantage that no dust can fall into flow channel 20 and collect in lower reversing curve 19. It is also possible to cover air inlet opening 14 by an air-permeable protective grate. In FIG. 3 the meander-shaped flow segments 20 are disposed on both sides of housing 12 of toaster 1. Preferably, flow channel 20 extends laterally over the entire length of lengthwise wall 4. At the edges, flow channel 20 is closed off for example by side walls 3. On the other hand it is also possible to provide flow channel 20 on all vertical housing walls 3, 4. In this case, flow channel 20 need not be closed off by side walls, but can form a closed ring around toast well 10. The individual segments of flow channel 20 then form concentric rings in a section parallel to bottom 6 as viewed from above, said rings running around toast well 10.

When toaster 1 is set operating, heating elements 11 heat not only toast well 10 but gradually, partitions 13 are heated as well. In addition, a reflector 16(not shown in FIG. 2) is provided, which reflects the radiant heat toward toast well 10. As toaster 1 heats up, a negative pressure develops at air outlet opening 15 and/or in toast well 10 and the flow channel segment which is formed by partition 13 and intermediate well 17. The negative pressure causes a cold air stream to be drawn in through air inlet opening 14 which initially rises upward in the colder flow channel segment. The cooler air, which is at room temperature, continues flowing continuously. After passing through reversing curve 19 the air stream flows downward until it reaches air outlet opening 15 and then preferably enters toast well 10. As indicated in FIG. 3 on the right-hand side of the housing by reference number 27, air outlet opening 15 can project into the interior to the point where the air stream does not rise upward until it reaches a suitable point between heating elements 11 and toast well 10. Since the air stream emerges at the loading and unloading opening 8 for the toast, a continuous air stream is produced from air inlet opening 14 to loading and unloading opening 8. The air stream absorbs the heat energy given from the walls off during its travel in flow channel 20 and transports it back to toast well 10. As a result of the long flow path, sufficient time remains to transfer the heat energy from the walls to the air stream. The cross section of flow channel 20 and the size of air inlet and outlet opening 14 and 15 are adjusted to the flow conditions of the toast well and the negative pressure generated by heating.

Figure 4:
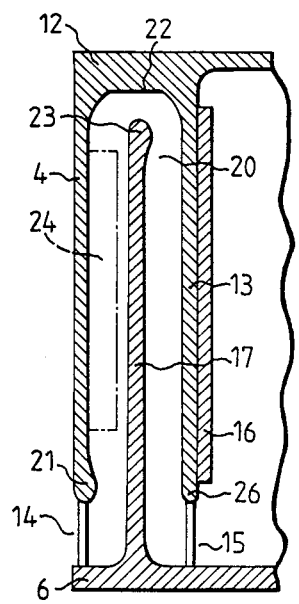
FIG. 4 shows devices for preventing air vortices in a flow channel.

All corners 26 and edges 18 on the walls which form flow channel 20 are rounded as shown in FIG. 4 in suitable fashion to produce a vortex free air stream with a constant flowrate. At especially critical points at which vortices could develop, additional devices are provided which promote an unimpeded flow pattern. Thus, for example, reversing curves 19 are made semi-circular in cross section and are modified to produce a vortex-free flow pattern by flattened areas which constrict the flow cross section. In addition it is possible to provide drop-shaped thickenings 21, 23 at the free ends and edges of the wall that produce vortices, favoring a separation-free and vortex-free flow. Preferably thickenings 21, 23. looking in the flow direction, are beyond the vortex-generating edge. Depending on the application, other flow-improving devices than those shown may be used.

Figure 5:
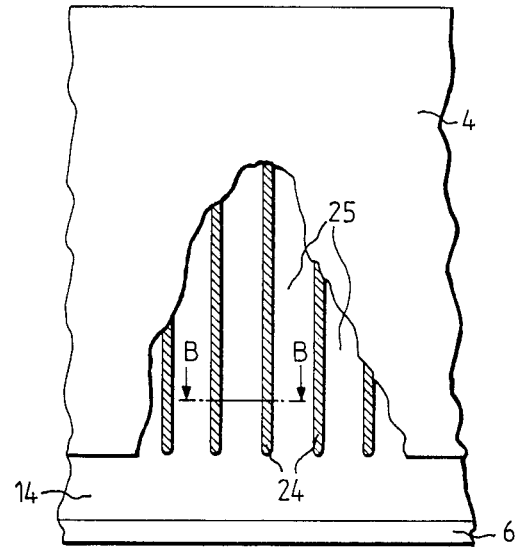
FIG. 5 is a cut-away section through a side elevation of the toaster according to the invention.

To increase the cooling action it is possible to provide devices in flow channel 20 which increase the area of the wall surfaces exposed to the air flow. The devices are intended to pose little obstruction to the flow pattern and preferably cooling ribs 24 are used, arranged in the flow direction. FIG. 5 shows such cooling ribs 24 on a portion of partition 4 in a side view of a toaster 1.

In FIG. 4, cooling ribs 24 are represented by dashed lines. The cooling ribs form narrow cooling channels 25, which simultaneously produce an orderly flow pattern in the broad flow channel 20, which for example is produced over the entire length of the housing. Preferably, cooling ribs 24 are made on the walls with the greatest heat potential. It is possible if desired to blacken or mirror-coat the inside walls of flow channel 20 in addition to cooling ribs 24. The walls facing toast wall 10 are preferably mirror-coated in order to reduce the heating caused by radiant heat caused by heat from toast well 10. On the other hand the walls that face outward should preferably be blackened in order to increase the cooling action by the air stream in the manner described above. However, the outermost housing wall should not be blackened since the toaster would be unnecessarily heated by insolation. The outermost housing wall of the toaster is therefore preferably left in a light reflecting color. In addition, cooling ribs 24 have the advantage that they contribute to the stiffening of the walls. Intermediate wall 17 can contact cooling ribs 24 when cooling ribs 24 are provided on partitions 4 and 13.

As shown in FIG. 3, flow channel 20 can be formed by heating partitions 4 and 13 and intermediate walls 17. Partitions 4 and 13 or other partitions are connected with upper well 5 and extend downward. A corresponding number of intermediate walls 17 is mounted on bottom 6. Intermediate walls 17 extend upward and project into the space bounded by partitions 4 and 13. Intermediate walls 17 thus subdivide the bounded area. Depending on whether air inlet and outlet openings 14 and 15 are at the top or bottom, more or fewer partitions 4 and 13 are provided than intermediate walls 17. The height of partitions and intermediate walls 4, 13, and 17 is dimensioned so that a gap is left at the top and bottom walls whereby reversing curve 19 is formed in simple fashion through which the air stream passes to enter the next segment of flow channel 20. The flow pattern changes direction through 180° after passing through one segment of flow channel 20 each time, whereby the air stream travels through air inlet opening 14 to air outlet opening 15. Preferably the segment of the flow channel extends over the entire height of the housing.

Since the heated air has a larger volume at the end of flow channel 20 then at the air inlet, it is advantageous for the cross section of the flow channel to increase toward the air outlet. This can be accomplished by intermediate wall 17 being closer to or further from the cooler partition. In FIG. 4, intermediate walls 17 must be closer to partition 4 to increase the flow cross section, and further from partition 13. In the case of a plurality of partitions and intermediate walls 4, 13, and 17 parallel to one another, the individual intermediate walls 17 can be disposed stepwise closer to the cooler partitions 4. Here, looking in the flow direction, we see first warm partition 13, followed by cooler partition 4 of the next segment of the flow channel. It is also possible to make the partitions and intermediate walls 4, 13, and 17 of different thicknesses along their cross sections in order to change the flow cross section. Likewise, the walls can have different shapes on the surfaces where the flow arrives and where it departs. Owing to the larger volume of the heated air stream, it may also be necessary to make air outlet opening 15 larger than air inlet opening 14.

According to FIGS. 3 and 4 the partitions and intermediate walls 4, 13, and 17 are made integral with the corresponding top or bottom walls 5 and 6. It is possible to injection-mold partitions 4 and 13 together with the top wall out of plastic. This also applies to the manufacture of intermediate walls 17, together with bottom 6. Partitions and intermediate walls 4, 13, and 17 however, can also be manufactured individually, for example out of sheet metal, and fastened to the corresponding walls. As is shown in FIG. 3, in this case partition 13 consists of the rear wall of reflector 16. Depending on whether air outlet opening 15 is made at the top or bottom, the back wall of reflector 16 forms partition 13 or intermediate wall 17. In contrast to the toaster 1 shown simplified in FIG. 3, suitable interruptions and insulating layers, not shown, can be provided to prevent the heat from being transported out of the middle bottom or upper wall area into the outer walls through heat conduction.

In addition, meander-shaped flow channel 20 can be made of two flat plates of equal area, mounted with a space between them. The plates are bounded laterally by two opposite edges. The remaining openings correspond to air inlet and outlet openings 14, 15. Here, by mounting the two plates so they are not parallel, air outlet opening 15 can easily be made larger than air inlet opening 14. By folding the two plates to form corruqations et the points where the reversing curves are to be produced, the walls can be shaped to produce the meander-shaped flow channel. The fold lines run parallel to the opening edges of air inlet and outlet openings 14 and 15 so that the partitions and intermediate walls are double after folding.

Figure 6:
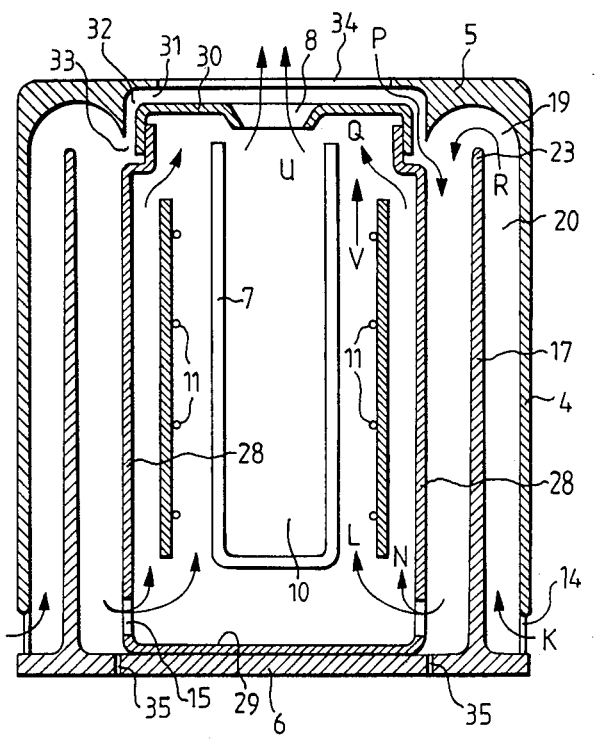
FIG. 6 is a section through a toaster according to another embodiment according to the invention.

FIG. 6 shows another embodiment of the toaster according to the invention wherein partition 13, according to the embodiment shown in FIG. 3, is formed by reflector 16. In FIG. 6, the reflector or partition has reference number 28, while as shown for example in FIG. 6 the two reflector walls together with a bottom wall 29 are bent to form a box out of a single piece of sheet steel. As described above, the air outlet openings 15 through which the heated air stream enters toast well 10 are provided in the lower housing area in the sheet steel. A cover panel 30 with the above-described inlet and outlet openings 8 for the toast is mounted on the top of reflecting walls 28. Cover panel 30, as shown in FIG. 6, is connected by folds with reflector walls 28 or is welded for example.

As can also be seen in FIG. 6, the outer housing design does not have partition 13 from FIG. 3, whose function is taken over by reflector wall 28. Reflector walls 28 are therefore so arranged that they essentially assume the position of original wall 13, so that in FIG. 6 the incoming area of flow channel 20 is made for example slightly narrower than the outflow section, since as described above the volume of the heated air in the outflow area of channel 20 increases. Preferably the distance between outer housing wall 4 and intermediate wall 17 is approximately 7 millimeters and the distance between wall 17 and reflector 28 is 10 millimeters. By eliminating partition 13 from FIG. 3, the advantage is gained that the hood-shaped outer part shown in FIG. 6 is easier to manufacture. In addition material is saved. Additionally, cover panel 30 is staggered somewhat with respect to top wall 5 and is therefore located lower down, providing an additional protection against contact with cover panel 30 when it heats up. Accordingly, top 5 of the housing has an opening 34 through which the toast can be fed into loading opening 8 in cover panel 30.

Although cover panel 30 in FIG. 6 runs parallel to top wall 5 it is possoible to make cover panel 30 funnel-shaped over its entire width, so that smaller parts of the toast which fall off as it is being loaded or unloaded will preferably go into toast well 10 through loading and unloading opening 8. Heating elements 11 in the embodiment shown in FIG. 6 are mounted on plates of insulating material, not shown in greater detail, disposed at a distance from the inside of reflector walls 28. The two insulating support plates shown are mounted in a manner not shown in greater detail, so that heating elements 11, as in all the embodiments shown previously, must also have a different winding pattern than that shown.

The reflecting properties of reflector walls 28 are achieved by nickel-plating the sheet steel parts, while all other metal parts of the toaster which form toast well 10 are preferably nickel-plated as well. The nickel-plated sheet steel offers the advantage that it has a low emission value by comparison to other reflecting coatings. Because of the low emission value, the nickel-plated metal parts are heated to a slighter degree.

As is also shown in FIG. 6, outer housing parts 4 and 5 of the toaster, which can be made of plastic materials because of the cooling action according to the inventionm do not rest directly on metal parts 28, 29, and 30, which essentially form the toast wel. Instead, a small gap is provided in the upper housing area between cover plate 30 and the inside of upper wall 5, which gap forms an additional flow channel 32. Since cover panel 30 in particular is heated by the rising heat, flow channel 32 in the form of a gap offers the advantage that the plastic parts are not deformed or damaged by the continuous administration of heat, which would be the case if the metal parts, especially vcover panel 30, were in contact with the plastic parts. In addition, flow channel 32 has an inlet opening 31 for cooler air drawn in from outside and an outlet opening 33 which preferably terminates in the upper part of reversing curves 19 in flow channel 20. Flow channel 32 is thus arranged in a form of a ring surrounding the entire opening 34 or inlet opening 31. As described below with reference to the flow conditions, the gap which corresponds to flow channel 32 forms a seal, although the gap between the metal and plastic parts is provided, which normally offers no sealing action. This advantageous sealing action is produced by flow conditions in flow channel 32 which prevents flow components of the main stream from escaping from to the outside. Inlet opening 31 can also be provided at a point other than that shown in FIG. 6. Likewise, flow channel 32 has no edges or parts that generate vortices. In addition, flow channel 32 can run in a direction other than that shown.

For an improved distinction, the individual flow components are represented hereinbelow by upper-case letters. The air stream K which enters at air inlet opening 14 is at room temperature and flows at approximately 0.2 meter per second in the rising segment of flow channel 20 and is heated in the manner described above. In upper reversing curve 19, air stream R has already been heated somewhat higher than room temperature and as a result of the flow, a certain negative pressure develops which causes a small component P to be drawn in through flow channel 32. Flow component P therefore enters at room temperature through opening 34 in upper wall 5 into inlet opening 31 of small flow channel 32 and then passes through outlet opening 33 to join main stream R, in the descending part of flow channel 20. The smaller flow P then mixes with main stream R, and because it is at room temperature exerts a cooling action on cover panel 30, especially in the vicinity of flow channel 32, on the channel walls. Accordingly, the metal parts and plastics parts, especially in the vicinity of flow channel 32, are cooled continuously. No heat bridges can form.

Flow channel 32 has a suitable width i.e. a suitable spacing between the metal and plastic parts. Since the metal wall, at a temperature of approximately 250° C. forms a so-called temperature boundary layer, it can expand in the direction of the cooler plastic layer in the course of several successive toasting cycles. Therefore, the gap width of flow channel 32 is dimensioned so that flow P, when the temperature boundary layer expands does not stop or is restricted to the point where the cooling action is ineffective. The temperature boundary layer is drawn in by main stream R at a lower velocity into flow channel 20 than flow P. The temperature boundary layer flows at approximately 0.01 meter per second and flow P at approximately 0.05 meter per second, whereby the gap width of flow channel 32 is preferably in the 3.5 millimeter range. The additional minor flow component P, which is at room temperature when it enters and is therefore cooler, poses no disadvantage for the above-described processes in flow channel 20. Rather, it produces additional advantages in addition to the advantage described above, namely the elimination of partition 13, in which plastics which are sensitive to heat can because of the cooling action be located in the vicinity of the heated metal parts. In addition, no great demands on the fit accuracy of the parts are required because flow-generating gap 32 is provided.

When the part of the flow enters through air inlet opening 15 into toast well 10, a main part L flows past heating elements 11 and forms flow component V at the top. A smaller flow component N flows behind the insulating support panel as shown on which heating elements 11 are formed and flows out as component Q in the upper part. The flow behind the insulating support panel means that here, in the case of flow channel 32, there can be no heat buildup or a heat bridge. When it emerges from air outlet opening 15, the flow has a flowrate of approximately 0.3 meter per second at temperature of 50° to 70°. In the upper areas of the toast well, where flow U emerges from the toaster, the flowrate is approximately 0.7 meter per second and the temperature 350°.

In addition, no great demands are imposed on the fit accuracy of assembled parts 5, 30 since the tolerance can be compensated by gap 32. Likewise, no stresses occur as a result of different coefficients of linear expansion of the parts, because they are not connected together. In addition, flow channel 32 contributes to the cooling of the handle area at the top of the housing. It is also possible to provide additional flow channel 35 in the bottom area which act in the same way as flow channel 32, in which they produce cooling between hot bottom plate 29 end plastic bottom 6. It is possible in this connection to make bottom panel 29 different than shown and to place it at a distance from bottom 6, for example by using supports. The sum of all the flow components through channels 35 is then less than the main flow L, N. In these flow channels 35, there can be for example round or elangated holes or openings. These flow channels 35 can also be preferably designed at other points in bottom 6 in order to cool certain components, as for example the vicinity of the line cord, which usually enters in the bottom part of the toaster and is fastened there. The effect of flow channels 35 in addition to the cooling action caused by the passage of air consist in the fact that it produces heat conduction traps and interfares with the conduction of heat through the material. In this case, flow channels 35 are preferably made linear or are disposed in a row around the bottom area to be cooled. For example, the lengthwise openings have their lengthwise axis lying on an imaginary line which can also be curved and have edges, whereby the spaces between the openings are kept as small as possible. A material bridge between two openings then has the length of the space between the openings. It is also possible if desired to provide large-area opening fields, whereby the openings are preferrably staggered with respect to one another.

Figure 7:
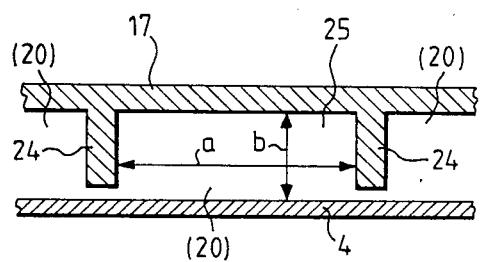
FIG. 7 is a section through cooling ribs along line B—B in FIG. 5.

FIG. 7 shows a section through cooling ribs 24 along line B—B in FIG. 5. In other words, in FIG. 7 a single cooling channel 25 is shown in cross section while the sum of all the cooling channels 25 forms a total flow channel 20. A cooling channel 25 is formed by intermediate wall 17, partition or lengthwise wall 4, and two cooling ribs 24.

In cross section, cooling channel 25 has a basically rectangular shape with sides a and b. To optimize the flow velocity, the length a of cooling channel 25 is made about three times the width b. In other words, line a is preferably 2.5 to 3.5 times b. If the dimensions of cooling channel 25 are arranged in this ratio, a flowrate with the optimum cooling action for the toaster according to the invention will be achieved. This ratio also applies to flow channels 32 and 35.

The present invention can be used in all domestic appliences whose outer walls are heated by interior heating elements and is therefore not limited to toasters. For example the invention can be used to cool the outer walls of a hot-air toaster oven. If desired, in other applications than a toaster, a blower can be provided if necessary to support the motion of the air stream in the flow channel.

I claim:

1. Electric toaster with heating elements, at least one toast well, into which the toast is fed through a loading and unloading opening, and a housing having inner, outer and intermediate wall portions, said wall portions of said housing being separated from one another and forming meander-shaped flow channel structure for an air stream introduced from outside, with the air stream entering the flow channel through an air inlet opening cooling said outer wall portions of said housing by convection as it passes through said meander-shaped flow channel structure and emerging through an air outlet opening, said meander-shaped flow channel structure including reversing curve portions located in the top and bottom areas of said meander-shaped flow channel structure such that the air stream flows in an upward direction in a first portion of said meander-shaped flow channel structure in a downward direction in a second portion of said meander-shaped flow channel structure.

2. Toaster according to claim 1 wherein said air outlet opening is located in the lower area of said toast wall.

3. Toaster according to claim 1 wherein said inner and outer wall portions of said meander-shaped flow channel structure include partitions members which run parallel to one another with a space between them, said partition members being secured adjacent the top wall of said housing and extend downwardly, and said intermediate wall portions are secured adjacent the bottom of said housing and extend upwardly, members, and the partition and intermediate wall members having heights such that gaps are formed at their free ends.

4. Toaster according to claim 3 wherein said meander-shaped flow channel structure consists of two partition members and one intermediate wall member.

5. Toaster according to claim 3 wherein said free ends of said partition members and said intermediate wall members are rounded.

6. Toaster according to claim 1 and further including devices in said meander-shaped flow channel structure to prevent air vortices.

7. Toaster according to claim 6 wherein said devices are drop-shaped thickenings, disposed at free ends of said partition and intermediate wall members on the wall side which is struck by the air stream after changing its flow direction.

8. Toaster according to claim 7 wherein said devices are flow-constricting flattened areas formed on semi-circular portions of said meander-shaped flow channel structure.

9. Toaster according to claim 3 wherein said intermediate wall structure is located closer to the outer partition member than to the inner partition member.

10. Toaster according to claim 3 wherein said air outlet opening is larger than said air inlet opening.

11. Toaster according to claim 3 wherein said intermediate wall structure is manufactured in one piece of plastic and is integral with the bottom of said toaster.

12. Toaster according to claim 3 wherein said partition members are manufactured in one piece of plastic and are integral with the top wall of said toaster.

13. Toaster according to claim 1 wherein said air inlet opening and said air outlet opening are provided in the vicinity of the bottom of said toaster.

14. Toaster according to claim 1 wherein said air inlet opening is provided with an air-permeable protective grate.

15. Toaster according to claim 3 and further including surface-increasing devices in said meander-shaped flow channel structure.

16. Toaster according to claim 15 wherein said surface-increasing devices are cooling ribs aligned in the flow direction.

17. Toaster according to claim 3 wherein said inner walls of meander-shaped flow channel structure are blackened or mirror-coated.

18. Toaster according to claim 1 and further including reflector structure on the last segment of said flow channel structure which terminates in said toast well.

19. Toaster according to claim 1 wherein said meander-shaped flow channel structure extends around said toast well as a closed continous ring walls.

20. Toaster according to claim and further including additional flow channel structure formed in the upper part of said toaster said additional channel structure terminating with an outlet opening in said meander-shaped flow channel structure and drawing room temperature air through its inlet opening.

21. Toaster according to claim 1 and further including supplemental flow channel structure in the form of openings in the bottom of said toaster.

22. Toaster according to claim 7, or wherein said flow channel structure have a ratio of width to length a/b which is in the range of a/b=1/(2.5 to 3.5).

* * * * *

UNITED STATES PATENT AND TRADEMARK OFFICE
CERTIFICATE OF CORRECTION

PATENT NO. : 4,718,332
DATED : January 12, 1988
INVENTOR(S) : Georg Mothrath

It is certified that error appears in the above-identified patent and that said Letters Patent are hereby corrected as shown below:

```
Col. 1, line  2, "preomble" should be --preamble--;
        line 19, "last" should be --East--;
        line 25, "font" should be --foot--.
Col. 2, line 28, "cobling" should be --cooling--;
        line 30, "Invention" should be --invention--.
Col. 3, line 31, "wells" should be --walls--;
        line 64, "The" should be --This--.
Col. 4, line 35, "23." should be --23,--;
        line 54, "wall" should be --well--.
Col. 5, line  2, "heating" should be --nesting--;
        line  4, "well" should be --wall--.
Col. 6, line  4, "et" should be --at--.
Col. 7, lines 3-4, "inventionm" should be --invention,--;
        line  5, "wel" should be --well--;
        line 13, "vcover" should be --cover--;
        line 54, after "width" a comma should be inserted;
        line 61, after "expands" a comma should be inserted.
Col. 8, line 24, "areas" should be --area--;
        lines 26-27, after "temperature" a comma should be inserted;
        line 38, "end" should be --and--;
        line 44, "elangated" should be --elongated--;
        line 52, "interfares" should be --interferes--;
Col. 9, line 13, "appliences" should be --appliances--.
Claim 3, col. 9, line 44, "partitions" should be --partition--;
Claim 3, col. 9, line 49, after "upwardly," --between two
        partition-- should be added.
Claim 8, col. 10, line 9, the numeral "7" should be --6--.
Claim 8, col. 10, line 11, after "circular" --reversing curve--
        should be added.
Claim 19, col. 10, line 44, "continous" should be --continuous--
```

UNITED STATES PATENT AND TRADEMARK OFFICE
CERTIFICATE OF CORRECTION

PATENT NO. : 4,718,332

DATED : January 12, 1988

INVENTOR(S) : Georg Mothrath

It is certified that error appears in the above-identified patent and that said Letters Patent is hereby corrected as shown below:

Claim 20, col. 10, line 45, after "claim" insert the numeral --1--.
Claim 22, col. 10, line 54, change "or" to --20 or 21--.
line 55, "structure" should be --structures--.

Signed and Sealed this

Twenty-second Day of November, 1988

Attest:

DONALD J. QUIGG

*Attesting Officer*   *Commissioner of Patents and Trademarks*